Figure 1:
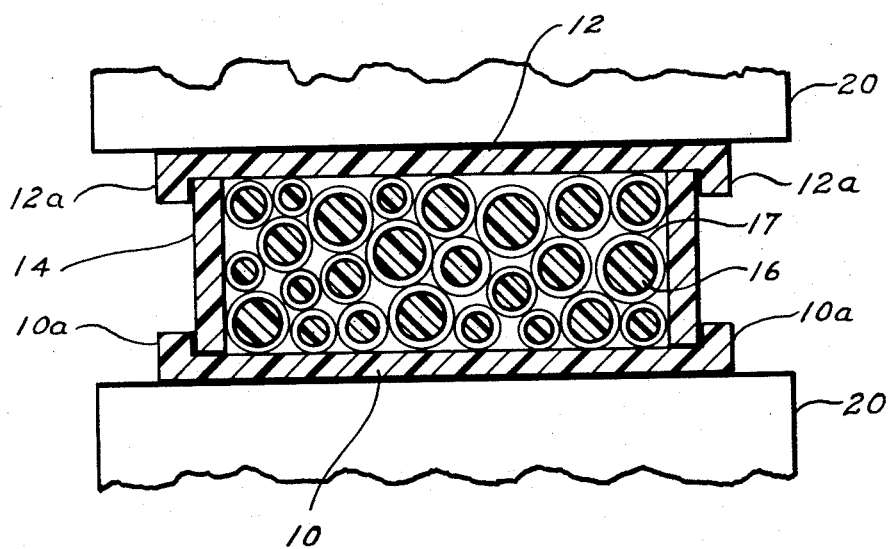

Nov. 28, 1961 E. P. CIZEK 3,010,157
METHOD FOR PREPARING MOLDINGS OF FOAMED THERMOPLASTIC RESINS
Filed Oct. 7, 1958 2 Sheets-Sheet 1

ERIC P. CIZEK INVENTOR.

BY
ATTORNEY.

Nov. 28, 1961           E. P. CIZEK           3,010,157

METHOD FOR PREPARING MOLDINGS OF FOAMED THERMOPLASTIC RESINS

Filed Oct. 7, 1958           2 Sheets-Sheet 2

STEP I: COAT THE SURFACES OF SMALL PARTIALLY FOAMED THERMOPLASTIC RESIN PARTICLES WITH AN AQUEOUS SOLUTION OF AN ELECTROLYTE (SAID RESIN PARTICLES CONTAINING THEREIN, AS A FOAMING AGENT, AN ORGANIC LIQUID WHICH BOILS BELOW THE SOFTENING POINT OF THE RESIN AND WHICH HAS AT MOST A SLIGHT SOLVENT ACTION ON THE RESIN).

STEP II: COMPLETELY FILL A MOLD WITH THE COATED RESIN PARTICLES FROM STEP I (SAID MOLD BEING FABRICATED FROM A MATERIAL HAVING A LOSS FACTOR OF LESS THAN ABOUT 0.03 WHEN MEASURED AT 10 MEGACYCLES).

STEP III: SEAL MOLD FROM STEP II

STEP IV: PASS ELECTRIC WAVES OF HIGH FREQUENCY ALTERNATING CURRENT THROUGH THE SEALED MOLD FROM STEP III TO CONVERT THE AQUEOUS COATING TO STEAM AND FURTHER FOAM THE RESIN PARTICLES TO FORM A HOMOGENEOUS FOAMED THERMOPLASTIC RESIN ARTICLE.

STEP V: REMOVE THE FINISHED FOAMED ARTICLES FROM THE MOLD.

ERIC P. CIZEK      INVENTOR.

— *Fig. 2* —

BY *Richard F. Kelly*
ATTORNEY.

United States Patent Office 3,010,157
Patented Nov. 28, 1961

3,010,157
METHOD FOR PREPARING MOLDINGS OF FOAMED THERMOPLASTIC RESINS
Eric P. Cizek, Springfield, Mass., assignor to Monsanto Chemical Company, St. Louis, Mo., a corporation of Delaware
Filed Oct. 7, 1958, Ser. No. 765,795
7 Claims. (Cl. 18—48)

This invention relates to a novel method for preparing molded articles of foamed thermoplastic resins.

Molded articles of foamed thermoplastic resins can be prepared by heating small particles of foamed thermoplastic resins having liquid foaming agents dispersed therein in metal molds. This method is inherently time-consuming and has a large heat requirement in that massive metal molds must be alternately heated and cooled. It would be desirable to have available to the art an alternate molding method having a shorter mold cycle time and a lower heat requirement.

It is an object of this invention to provide a novel method for preparing moldings of foamed thermoplastic resins.

Another object of the invention is to provide a novel method for preparing moldings of foamed thermoplastic resins which has a short mold cycle time.

A further object of the invention is to provide a novel method for preparing moldings of foamed thermoplastic resins which has a low heat requirement.

Other objects and advantages of the invention will be apparent from the following detailed description thereof when read in conjunction with the single drawing, partially in section, of one form of apparatus that may be employed in carrying out the invention.

The above and related objects are attained by completely filling a sealed mold with partially foamed thermoplastic resin particles containing therein a foaming agent, the surfaces of substantially all of said resin particles being coated with a dilute aqueous solution of an electrolyte, and passing electric waves of high frequency alternating current through the sealed mold for a period of time sufficient to convert the water of the aqueous coating carried on said foamed thermoplastic resin particles into steam and further foam said foamed thermoplastic resin particles to form a unitary foamed thermoplastic resin article. The partially foamed thermoplastic resin particles employed in the process will have dispersed therein, as the foaming agent, an organic liquid which boils below the softening point of the resin and which has at most a slight solvent action on the thermoplastic resin. The mold employed in the process will be fabricated from a material having a loss factor of less than about 0.03 (measured at 10 megacycles). By employing the process of this invention, it is possible to prepare moldings of foamed thermoplastic resins up to 3″ thick in mold cycles of about 2–20 seconds.

FIG. 1 is a sectional view of one embodiment of the apparatus employed in molding a foamed polystyrene block, and FIG. 2 is a flow sheet illustrating the process of this invention.

The following examples are set forth to illustrate more clearly the principle and practice of this invention to those skilled in the art. Where parts or quantities are mentioned, they are parts or quantities by weight unless otherwise specified.

EXAMPLE I

Part A

Spherical particles (approximately 2–5 mm. in diameter) of polystyrene having 5% pentane dispersed therein are partially expanded by being maintained in boiling water for 5 minutes. The partially expanded polystyrene particles thus obtained have a bulk density of about 2 lbs./ft.$^3$.

Part B

The partially expanded polystyrene particles from Part A above are stirred well in a large volume of water having dissolved therein 1% of sodium lauryl sulfate. The polymer particles are drained free from the treating solution and have adsorbed on the surface about 20 weight percent of the sodium lauryl sulfate solution.

Part C

A rectangular block of foamed polystyrene measuring 6″x2″x1.75″ is prepared from the coated partially expanded polystyrene beads from Part B above employing the apparatus illustrated in FIG. 1. The mold consists of a bottom plate 10, a top plate 12 and a rectangular frame 14, all of which are fabricated from polytetrafluoroethylene. The top and bottom plates are provided with, respectively, lips 10a and 12a which position and seat frame 14. Plates 10 and 12 are both 0.125″ thick and the height of frame 14 is 1.75″, thus the assembled mold is 2″ thick. The mold cavity is completely filled with partially expanded polystyrene particles 16, each of which carries a coating 17 of an aqueous solution of sodium lauryl sulfate, which coating is shown in exaggerated thickness for purposes of illustration. The mold is positioned between and in touching relationship with the plates or electrodes 20—20 of a conventional high frequency dielectric heating apparatus. A high frequency, high voltage field of 6,000 volts and 80 megacycles is applied across plates or electrodes 20—20 for 5 seconds. This treatment further expands and fuses the partially expanded polystyrene particles to form a solid block of foamed polystyrene having a density of about 2 lbs./ft.$^3$.

EXAMPLES II–VI

Several batches of the partially expanded polystyrene particles from Example I, Part A are coated with aqueous solution containing 1% of the electrolytes set forth in Table I employing the technique described in Example I, Part B. In addition to the electrolyte, each of the aqueous solutions also contains 0.1% of a nonionic surfactant (an ethylene oxide condensate of nonylphenol). Each lot of the coated partially expanded polystyrene particles is molded into a homogeneous well fused rectangular block of foamed polystyrene employing the technique described in Example I, Part C.

TABLE 1

| Example: | Electrolyte |
|---|---|
| II | Sodium chloride. |
| III | Sodium sulfate. |
| IV | Sodium carboxymethyl cellulose. |
| V | Sodium salt of polyacrylic acid. |
| VI | Sodium salt of an equimolar styrene-maleic anhydride copolymer. |

EXAMPLE VII

Example I is repeated except that the polystyrene containing pentane as a foaming agent is replaced with a homopolymer of polymethyl methacrylate having dispersed therein, as a foaming agent, 5 weight percent of isopentane. A corresponding block of foamed polymethyl methacrylate is obtained.

EXAMPLE VIII

Example I is repeated except that in Part C thereof polystyrene sheets 0.010″ thick are placed against the bottom and top surfaces of the mold. The product obtained is a foamed polystyrene block having sheets of an unfoamed polystyrene laminated to the surfaces thereof.

EXAMPLE IX

Example VIII is repeated except that the polystyrene sheets are replaced with sheets of 125 lb. kraft paper. The product is a block of polystyrene having paper sheets laminated to the surfaces thereof.

The resin compositions employed in the process of the invention are particles of a foamed thermoplastic resin which have dispersed therein, as a foaming agent, an organic liquid which boils below the softening point of the resin and which has at most a slight solvent action on the thermoplastic resin. For convenience in the subsequent description of the invention, these resin particles will be referred to as partially foamed resin particles and the organic liquid included therein will be referred to simply as the foaming agent. Such partially foamed resin particles can be readily obtained by simply heating unfoamed thermoplastic resin particles having a foaming agent dispersed therein to a temperature above the softening point of the resin. This initial heating and partial foaming of the thermoplastic resin may be carried out by any conventional means such as hot air ovens, infrared heaters, hot water, steam, etc. The density of such partially expanded resin particles can be varied considerably and if partially expanded resin particles of very low density are desired the initial expansion can be carried out in multiple steps. In general the partially foamed resin particles employed in the process should have a bulk density of about 1–25 and preferably 1–5 lbs./ft.$^3$. The density of the ultimate molded article will be substantially equal to the bulk density of the partially foamed resin particles used to fill the mold.

The thermoplastic resin employed in the process of the invention may be essentially any thermoplastic resin such as a cellulose ether or ester, e.g., ethyl cellulose, cellulose acetate, cellulose nitrate, cellulose butyrate; a homopolymer or interpolymer derived from a vinylidene monomer such as a vinyl halide, e.g., vinyl chloride, vinyl bromide; vinylidene chloride; and acyclic olefin, e.g., ethylene, propylene, isobutylene, butadiene; a vinyl ester of a monocarboxylic acid, e.g., vinyl formate, vinyl acetate, vinyl stearate, vinyl benzoate; and unsaturated carboxylic acid or a derivative thereof, e.g., acrylic acid, methacrylic acid, ethyl acrylate, methyl methacrylate, 2-ethylhexyl acrylate, acrylamide, methacrylamide, acrylonitrile, methacrylonitrile; a vinylidene aromatic compound, e.g., styrene, alpha-methylstyrene, vinyl naphthalene; an interpolymer of a vinylidene monomer of the above type with an alpha,beta-unsaturated polycarboxylic acid or a derivative thereof, e.g., maleic anhydride, diethyl maleate, dibutyl fumarate, etc. It is feasible and sometimes desirable to employ blends of two or more thermoplastic resins of the above type or a graft copolymer prepared by polymerizing a vinylidene monomer in the presence of a preformed polymer.

The foaming agent incorporated in the thermoplastic resin may be any organic liquid having a boiling point below the softening point of the thermoplastic resin and which has at most a slight solvent action on the thermoplastic resin. Examples of suitable foaming agents include pentane, isopentane, neopentane, hexane, heptane, petroleum ether, cyclopentane, cyclopentadiene, acetone, methanol, methyl acetate, ethyl acetate, methyl formate, ethyl formate, dichloroethylene, isopropyl chloride, propionaldehyde and diisopropyl ether.

Coloring agents, pigments, light and heat stabilizers, lubricants, and other plastic compounding agents may be included in the resin compositions if desired.

A preferred class of resin compositions for use in this invention consists of a vinylidene aromatic polymer having dispersed therein, as a foaming agent, an aliphatic hydrocarbon having a boiling point in the range of 10–90 and preferably 30–80° C. The vinylidene aromatic polymer may be a homopolymer of a vinylidene aromatic compound of the group consisting of styrene, ring-alkyl substituted styrenes, e.g., o-, m- and p-vinyltoluene, 2,4-dimethylstyrene, etc., ring-halo-substituted styrenes, e.g., o-, m-, and p-chlorostyrene, 2,4-dichlorostyrene, 2,5-dichlorostyrene, etc., and ring-alkyl, ring-halo-substituted styrenes, e.g., 2-methyl-4-chlorostyrene, etc. or an interpolymer of at least 50 and preferably 75 weight percent of a vinylidene aromatic monomer of the above type with one or more interpolymerizable vinylidene monomers. Examples of monomers that may be interpolymerized with the vinylidene aromatic monomer include the conjugated 1,3-dienes, e.g., butadiene, isoprene, etc.; alpha,beta-unsaturated monocarboxylic acids and derivatives thereof, e.g., acrylic acid, methyl acrylate, ethyl acrylate, 2-ethylhexyl acrylate and the corresponding esters of methacrylic acid, acrylamide, methacrylamide, acrylonitrile, methacrylonitrile, etc.; alpha-alkyl substituted styrenes, e.g., alpha-methylstyrene, etc.; divinylbenzene; etc. In general, the vinylidene aromatic polymers employed should have a molecular weight in the range of about 40,000–80,000 (as determined by the Staudinger method).

An essential feature of the invention is the fact that the mold is completely filled with the partially foamed resin particles. Unless the limitation is observed, the filled mold must be maintained in the high frequency field for an unduly long period of time to obtain a good molding.

Another critical feature of the invention is the fact that the surfaces of the partially foamed resin particles are uniformly coated with a dilute aqueous solution of an electrolyte. If the electrolyte solution is merely placed in the filled mold but not uniformly coated on the partially foamed resin particles, the high frequency alternating current must be passed through the mold for long periods of time to obtain homogeneous well fused moldings.

The quantity of aqueous electrolyte solution employed to coat the partially foamed resin particles will depend upon (1) the average surface area per unit weight of the partially foamed resin particles and (2) the average thickness desired in the coating. By employing partially foamed resin particles having diameters in the range of 3–20 millimeters, satisfactory results are obtained with as little as 5 weight percent of aqueous electrolyte solution (based upon the weight of the partially foamed resin particles) and it is not practical to employ substantially more than about 50 weight percent of aqueous electrolyte solution. In general, it is preferred to employ 10–30 weight percent of electrolyte solution.

The partially foamed resin particles can be coated with the aqueous electrolyte solution by numerous methods which will be apparent to those skilled in the art. For example, the partially foamed resin particles can be simply immersed in a large excess of the aqueous electrolyte solution and then separated therefrom. Alternatively, the desired quantity of electrolyte solution may be added to the dry partially foamed resin particles with stirring to uniformly coat the resin particles. In another embodiment of the invention it is possible to first lay down an electrolyte on the surface of the partially foamed resin particles by any suitable means and to subsequently coat the partially foamed resin particles with water to form the electrolyte solution in situ on the surface of the partially foamed resin particles. In this method, for example, the electrolyte can be dissolved in a volatile solvent such as ether or alcohol and coated onto the partially foamed resin particles, with the resin particles being subsequently freed of the volatile solvent by mild heat. In yet another embodiment of the invention the electrolyte solution can be coated onto the partially foamed resin particles by a three step process in which (1) an electrolyte is laid down on the unfoamed resin particles, (2) the unfoamed resin particles are partially foamed and (3) water is coated onto the partially foamed resin particles to form the aqueous electrolyte solution in situ on the surface of the partially foamed resin particles.

Virtually any water soluble or water dispersible material that will ionize in water can be employed as the electrolyte in the aqueous electrolyte solution. Thus, it is possible to employ not only ionizable inorganic materials such as sodium chloride, sodium sulfate, etc., but also ionizable water-soluble organic compounds such as carboxylic acids, amines, amine salts, phenols, sulfonic acids, etc. The concentration of electrolyte included in the aqueous electrolyte solution may vary from trace amounts of the order of 0.001 weight percent to substantial quantities of the order of 10–20 weight percent, although in general it is preferred to include 0.1–5.0 weight percent of the electrolyte in the aqueous electrolyte solution. In addition to the electrolyte, it is desirable to include a surface active agent in the aqueous electrolyte solution to facilitate the attainment of a uniform coating on the partially foamed resin particles. In a preferred embodiment of the invention, an ionic surfactant such as an alkyl sulfonate, an alkyl sulfate, an aryl sulfonic acid, a quaternary ammonium compound, etc. is employed in the aqueous coating solution and functions as both an electrolyte and as a surface active agent.

The mold employed in the process of the invention must be fabricated from a material which is not readily heated by passing a high frequency alternating current therethrough. The mold material employed will have a loss factor of less than about 0.03 and preferably less than about 0.02 (both valves being measured at 10 megacycles). Ideally, the material employed in the mold will also have a dielectric constant of less than about 4.0 (measured at 10 megacycles). Typical examples of the materials that may be employed are plastics such as polyethylene, polypropylene, polytetrafluoroethylene, polymethyl methacrylate, polystyrene, styrene-acrylonitrile copolymers, etc., glass, quartz, porcelain, resin impregnated laminates, e.g., paper impregnated with phenolic or melamine resins, etc.

The methods employed to apply a high frequency alternating current across the mold are well-known in the art and several forms of equipment suitable for this purpose are commercially available. As is known, the heat which is induced into materials by a high frequency alternating current is proportional to the frequency of the current and the square of the applied voltage. As a result, to obtain desirable short molding cycles, both the frequency and applied voltage should be as high as is feasible. Generally, it is desirable to employ a frequency of at least 1 megacycle and preferably at least 10 megacycles and an applied voltage of at least 1,000 volts and more especially at least 3,000 volts.

The time required to mold a foamed resin piece is dependent upon such a mulitiplicity of factors that it is impossible to state the time required until all of the parameters of the system are first prescribed. In general, the time required will depend upon, among other factors; (1) the softening temperature of the partially foamed resin particles, (2) the foaming agent included in the partially foamed resin particles, (3) the ratio of the aqueous electrolyte coating solution employed per unit weight of partially foamed resin, (4) the concentration of electrolyte included in the aqueous electrolyte coating solution, (5) the volume of the mold, (6) the distance between the plates or electrodes across which the high frequency alternating current is applied, (7) the voltage applied across the plates or electrodes and (8) the frequency of the alternating current applied across the electrodes. As an illustration, however, foamed polystyrene moldings up to 3″ thick can be prepared in not more than 20 seconds when the partially foamed resin particles are coated with 20 weight percent of a 1% electrolyte solution and an alternating current of 6,000 volts and 80 megacycles is applied across a polytetrafluoroethylene mold with the plates or electrodes of the heating apparatus being spaced not more than 6″ apart.

The above descriptions and particularly the examples are set forth for purposes of illustration only. Many variations and modifications thereof will be obvious to those skilled in the art and can be employed without departing from the spirit and scope of the invention therein described.

What is claimed is:

1. A process for preparing a foamed thermoplastic article which comprises completely filling a sealed mold with small particles of a foamed thermoplastic resin having dispersed therein, as a foaming agent, an organic liquid which boils below the softening point of the resin and which has at most a slight solvent action on the thermoplastic resin, the surfaces of substantially all of said foamed thermoplastic resin particles being coated with a material of the group consisting of (a) an aqueous solution having dissolved therein both a surface active agent and 0.001–20 weight percent of an electrolyte and (b) an aqueous solution having dissolved therein only an ionic surface active agent, and passing electric waves of high frequency alternating current through the sealed mold for a period of time sufficient to convert the water of the aqueous coating carried on said foamed thermoplastic resin particles into steam and further foam said foamed thermoplastic resin particles to form a homogeneous foamed thermoplastic resin article; the mold employed in the process being fabricated from a material having a loss factor of less than about 0.03 when measured at 10 megacycles.

2. The process of claim 1 in which the foamed thermoplastic resin employed is a vinylidene aromatic polymer having dispersed therein, as a foaming agent, an aliphatic hydrocarbon having a boiling point of 10–90° C.; said vinylidene aromatic polymer being selected from the group consisting of (1) homopolymers of a vinylidene aromatic compound of the group consisting of styrene, ring-alkyl substituted styrenes, ring-halo substituted styrenes, and ring-alkyl, ring-alkyl substituted styrenes and (2) interpolymers of at least 50 weight percent of a vinylidene aromatic compound of the group set forth above and an interpolymerizable vinylidene monomer.

3. The process of claim 1 in which the alternating current employed has a voltage of at least 1,000 volts and a frequency of at least 10 megacycles.

4. The process of claim 2 in which the alternating current employed has a voltage of at least 1,000 volts and a frequency of at least 10 megacycles.

5. The process of claim 3 in which the mold is fabricated from a material having a loss factor of less than about 0.02 when measured at 10 megacycles.

6. The process of claim 4 in which the mold is fabricated from a material having a loss factor of less than about 0.02 when measured at 10 megacycles.

7. The process of claim 6 in which the mold is fabricated from polytetrafluoroethylene.

References Cited in the file of this patent

UNITED STATES PATENTS

| | | |
|---|---|---|
| 2,459,225 | Hickock | Jan. 18, 1949 |
| 2,500,866 | Ramsay | Mar. 14, 1950 |
| 2,751,315 | Staehle | June 19, 1956 |
| 2,787,809 | Stastny | Apr. 9, 1957 |

OTHER REFERENCES

Brown et al.: "Radio Frequency Heating," 1947, p. 26, published by D. Van Nostrand Co., Inc., N.Y.

Koppers booklet, Dylite-Expandable-Polystyrene, 1954, page 19 (copy in 18–48S).

Notice of Adverse Decision in Interference

In Interference No. 93,036 involving Patent No. 3,010,157, E. P. Cizek, METHOD FOR PREPARING MOLDINGS OF FOAMED THERMOPLASTIC RESINS, final judgment adverse to the patentee was rendered Apr. 30, 1965, as to claims 1 and 2.

[*Official Gazette June 22, 1965.*]